United States Patent [19]

Gordon

[11] Patent Number: 4,613,187

[45] Date of Patent: Sep. 23, 1986

[54] BICYCLE AND STATIONARY SEATS

[76] Inventor: James F. Gordon, 1276 Flying Bridge La., Osprey, Fla. 33559

[21] Appl. No.: 809,152

[22] Filed: Dec. 16, 1985

Related U.S. Application Data

[63] Continuation-in-part of Ser. No. 748,481, Jun. 25, 1985, abandoned.

[51] Int. Cl.$^4$ .............................................. A47C 7/02
[52] U.S. Cl. ................................... 297/195; D6/354; 297/214; 297/452
[58] Field of Search ............... 297/243, 195, 199, 214, 297/452; 280/202, 291, 289; D6/354

[56] References Cited

U.S. PATENT DOCUMENTS

| D. 244,627 | 6/1977 | Ryan ....................................... D6/354 |
| 471,417 | 3/1892 | Bunker ................................. 297/195 |
| 538,063 | 4/1895 | Bunker ................................. 297/199 |
| 638,519 | 12/1899 | Meisselbach et al. ............... 297/202 |
| 2,459,066 | 1/1949 | Duke .................................... 297/195 |
| 2,690,211 | 9/1954 | Wentz ............................... 248/155.1 |
| 3,874,730 | 4/1975 | Marchello ........................... 297/452 |
| 4,176,880 | 12/1979 | Marchello ........................... 297/452 |
| 4,387,925 | 6/1983 | Barker et al. ....................... 297/201 |

FOREIGN PATENT DOCUMENTS

| 99922 | 11/1897 | Fed. Rep. of Germany ...... 297/195 |
| 1149147 | 5/1963 | Fed. Rep. of Germany ...... 297/195 |
| 21061 | of 1910 | United Kingdom ................ 297/195 |

Primary Examiner—Peter A. Aschenbrenner
Attorney, Agent, or Firm—Michaelson, Einschlag, Ostroff & Winter

[57] ABSTRACT

Apparatus for a bicycle seat (3) which is comfortable to use, especially for long distance riding, and supports a rider's buttocks without imparting soreness to the crotch, is described. This apparatus comprises a multi-layered cylindrical seat bar (10). This bar is fabricated from a rigid tubular member (11) which is surrounded by a concentric layer of resilient cushioning material (12) and then by a durable covering (14). The seat bar is mounted to the bicycle in a direction substantially transverse to the frame of the bicycle so that the seat bar abuts against and spans the entire width of the rider's buttocks (44) and does not contact the crotch (43) of the rider whenever the rider sits on the bicycle. Various different embodiments of the bicycle seat are disclosed herein.

30 Claims, 15 Drawing Figures 4,613,187

BICYCLE AND STATIONARY SEATS

CROSS REFERENCE TO RELATED APPLICATION

This is a continuation-in-part of my parent patent application entitled "Bicycle Seat" filed June 25, 1985 and assigned Ser. No. 748,481; now abandoned.

BACKGROUND OF THE INVENTION

The invention pertains to the field of seats, particularly those suitable for use on vehicles, such as bicycles and the like.

Bicycles see widespread use to provide transportation, recreation and professional racing. Some individuals may ride a bicycle for a few minutes at a time; while others may ride for as much as several hours at a time. Over the last two decades, bicycle designers have concentrated on making bicycles lighter and stronger. This has been achieved in part by the continual substitution of increasingly lighter but stronger metallic alloys for those previously used. As such, the weight of a typical bicycle has substantially decreased over the past few years, thereby affording the rider the ability to pedal the bicycle over greater distances before becoming fatigued.

Although much attention has been directed to making bicycles lighter, relatively little attention has been paid by bicycle designers to making a bicycle more comfortable to ride. In particular, a very common and traditional bicycle seat comprises a rather small triangular shaped piece of seat material, such as leather or thick pliable plastic, which is secured around a suitable frame. The front portion (often called the "horn") of this seat, which points toward the front of the bicycle, is narrow and elongated; while the rear portion of this seat is somewhat wider, though not nearly as long as, the front portion and slightly extends perpendicularly outward from both sides of the bicycle. In some of these seats, the seat material may be outwardly supported from the frame by an arrangement of springs or by one or more separate pieces of compressible material, such as dense polyurethane foam or the like. This seat is then secured through a suitable seat post directly to the frame of the bicycle.

In use, the rider straddles this seat. In particular, he positions himself so that the front portion of the seat is situated directly under his crotch and the rear portion extends back below the rider's buttocks and hence spans and supports small adjacent portions of the buttocks that lie behind either side of the crotch. Unfortunately, whenever a rider mounts such a seat and pedals a bicycle, all the weight of the rider, apart from that of his legs, is supported by the relatively narrow front portion of the seat. Inasmuch as the front portion only supports the rider's crotch, this weight bears down on the crotch and, as a result, over a long period of time, irritates the crotch and causes it to become sore.

As reported in the booklet Spence et al, *Keeping the Rider in the Ride* (c. 1984, Spenco Medical Corporation: Waco, Texas), this soreness (often called "saddle soreness") can result from various causes, all induced by the bicycle seat. These causes specifically include: bruising of the subcutaneous tissues of the buttocks resulting from these tissues being squeezed between the bones of the pelvis and the bicycle seat, saddle sores resulting from chafing and excoriation of the skin situated directly under the supporting bones of the pelvis, penile numbness resulting from pressure exerted by the horn of the seat onto the blood vessels on the underside of the penis, increased prostate tenderness particularly in men suffering from prostatitis (inflammation and engorgement of the prostate), and urethritis (including sharp localized pain, painful urination and bleeding) in women resulting from pressure exerted by the seat horn on the external opening of the urethra.

As the result of the onset of saddle soreness, the rider will often sense his crotch becoming sore before he feels sufficiently fatigued and will therefore prematurely terminate the ride due to this soreness. Oftentimes, in some riders, the onset and continuance of this soreness will increase the fatigue. Thus, the soreness resulting from the poor support provided by the bicycle seat rather than fatigue resulting from propelling the combined weight of the bicycle and the rider compels the rider, particularly a long distance rider, to terminate the bicycle ride.

The art has recognized this problem and, in response, has proposed several different arrangements for bicycle seats all ostensibly aimed at increasing the rider's comfort. However, upon close examination, these arrangements possess various drawbacks. For example, U.S. Pat. No. 471,417 (issued to W. I. Bunker on Mar. 22, 1892) discloses a bicycle seat made of one or more resilient tubular shaped members, such as rubber, or rubber and canvas or the like, which run between two arms, sockets or the like. This seat is mounted parallel to the bicycle, i.e. parallel to the plane of the wheels of the bicycle. In use, the rider straddles all the tubular members, much like he straddles the front portion of the traditional triangular seat. These members run directly under and along the rider's crotch. Inasmuch as these members are resilient, the rider "bounces" up and down on the central portion of these members as he rides the bicycle. The resiliency of these members permits them to absorb some of the shock of the road that would otherwise be transmitted back to the rider, thereby ostensibly increasing the rider's comfort. Unfortunately, inasmuch as the seat must provide firm support for the rider, the tubular members must always remain firm and hence their elasticity must be quite limited. Here too, most of the rider's weight is concentrated onto the rider's crotch as in the traditional seat and hence the arrangement shown in this patent provides little, if any, added comfort for the rider.

U.S. Pat. Nos. 3,874,730 (issued to J. L. Marchello on Apr. 1, 1975) and 4,176,880 (also issued to J. L. Marchello on Dec. 4, 1979) describe very similar arrangements for a bicycle seat. Here, two relatively broad flat members, e.g. straps or the like, are pivotedly connected to and extend between two upright legs of a U-shaped member which is mounted to a bicycle in a position transverse to the plane of the wheels. Whenever a rider mounts this seat, both of these members span completely across the rider's buttocks and pivot upward against the buttocks. Unfortunately, such a seat is not sufficiently firm to provide the rider with adequate comfort.

U.S. Pat. No. 4,387,925 (issued to J. A. Barker et al on June 14, 1983) discloses another arrangement for a bicycle seat. This arrangement uses a single firm elongated contoured cushion to pivotedly abut against and support each side of a rider's buttocks and the back of the upper leg. Although this arrangement only and firmly supports a substantial portion of a rider's buttocks and dispenses with the need to support the crotch thereby advantageously preventing any soreness from being imparted to the crotch, this arrangement is somewhat complex and hence expensive to manufacture. Moreover, if the rider is pedaling a bicycle while positioned atop this seat, the cushion repetitively rubs against the back of a rider's leg in a region situated below the buttocks which, over time, leads to chafing and discomfort.

Thus, a need exists in the art for a bicycle seat which is comfortable, especially for long distance riding, and is simple and inexpensive to manufacture.

SUMMARY OF THE INVENTION

Accordingly, an object of the present invention is to provide a bicycle seat which is comfortable to use, especially for long distance riding.

A particular object is to provide such a seat that firmly supports a rider's buttocks without imparting soreness to the crotch.

A further object is to provide such a seat that is simple and inexpensive to manufacture.

These and other objects are accomplished in accordance with the present invention by a bicycle seat comprising: a cylindrical seat bar having a rigid cylindrical member extending substantially the entire width of the seat, a resilient material of predetermined thickness concentrically surrounding the cylindrical member, and a relatively thin cover of durable material concentrically surrounding the resilient material; wherein the cylindrical seat bar is mounted to the bicycle in a direction substantially tranverse to the frame of the bicycle so that the seat bar abuts against and spans the entire width of the rider's buttocks and does not contact the crotch of the rider whenever the rider sits on the bicycle.

In accordance with various embodiments disclosed herein, the seat bar has two end caps each of which mates with an end of the tubular member. One or both of these caps can be removeable. Whenever an end cap is removed from the seat bar, this affords access to the hollow space contained within the tubular member. As such, the rider can store various small objects, such as a bicycle lock and chain within the seat bar. In addition, the end cap may be translucent and contain a battery operated light, which when energized, signals motorists as to the presence of the bicycle and its rider. This makes the bicycle more visible at night and thereby increases the safety of bicycle riding.

Since the inventive seat is safe, comfortable, inexpensive to manufacture and requires relatively little space while being used or stored, this seat can also be advantageously used in many stationary applications.

BRIEF DESCRIPTION OF THE DRAWING

A complete understanding of the principles of the present invention may be gained by considering the following detailed description in conjunction with the drawing, in which.

To facilitate understanding, identical reference numerals are used to denote identical elements common to the figures.

DETAILED DESCRIPTION

Figure 1:
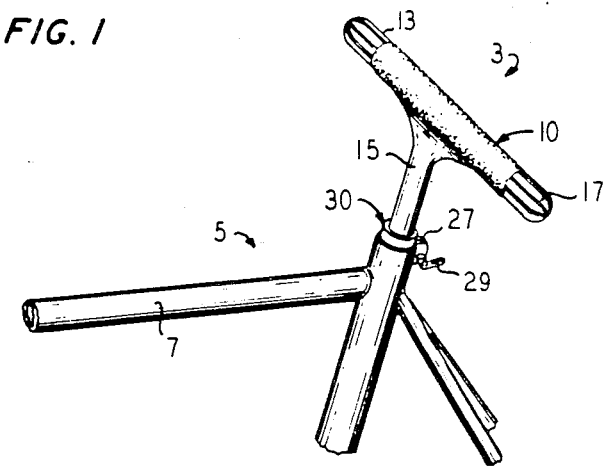
FIG. 1 is a sketch showing the orientation in which the inventive seat is secured to a bicycle frame.

As shown in FIG. 1, bicycle seat 3, embodying the teachings of the present invention and shown in its simplest form, comprises seat bar 10, having ends 13 and 17, mounted to seat post 15. Collar 27 is situated around seat post 15 and both are inserted into seat post opening 30 in bicycle frame 5. As discussed in greater detail later, lever 29 is appropriately turned to compress the collar against the seat post and thereby secure the seat in its proper position: transverse to the plane of the wheels of the bicycle, i.e. transverse to the direction of cross-support bar 7 in frame 5. As described in detail below, bicycle seat 3 can be any one of several different embodiments.

Figure 2:
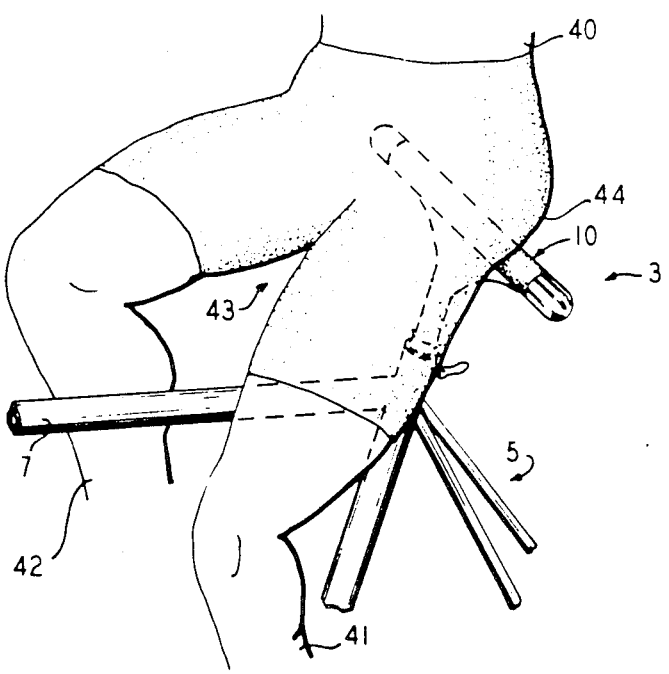
FIG. 2 depicts the inventive seat in use.

FIG. 2 shows the inventive seat in use. As shown, rider 40 mounts the seat with his legs 41 and 42 straddling cross-support bar 7 and with the entire width of his buttocks 44 resting across seat bar 10. As distinguished from the traditional triangularly shaped bicycle seat ("saddle") known to the art, inventive bicycle seat 3 does not abut against the rider's crotch 43, but rather only across his buttocks. As such, no portion of the rider's weight is supported by his crotch. Inasmuch as the inventive seat supports the rider solely across the entire width of his buttocks instead of partially through his crotch as in traditional bicycle seats, the inventive seat effectively prevents the crotch area from becoming sore, particularly after riding for a relatively long period of time. As such, the inventive bicycle seat is advantageously quite comfortable.

Figure 3:
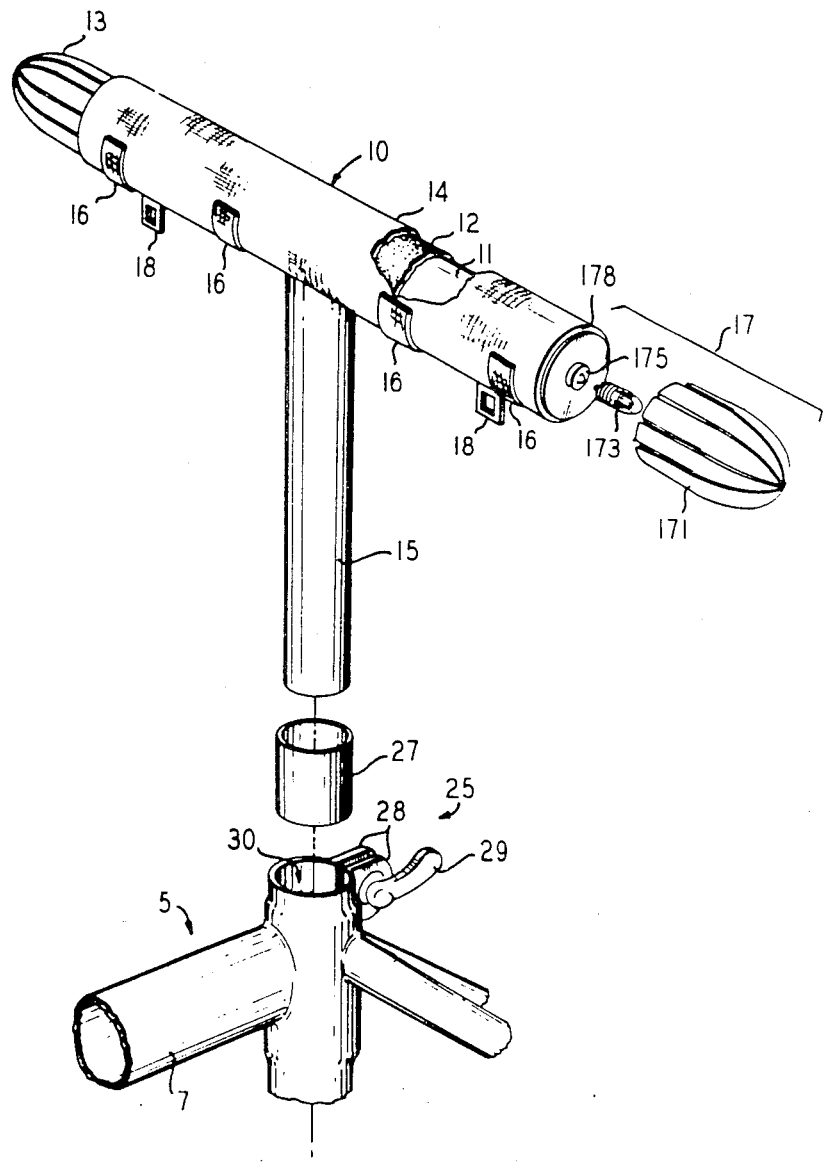
FIG. 3 shows a first embodiment of a bicycle seat constructed in accordance with the principles of the present invention.

One embodiment of the inventive bicycle seat is depicted in detail in FIG. 3. Here, seat bar 10 is comprised of a multi-layered structure; namely, a central rigid tubular member 11 which is concentrically surrounded by resilient layer 12 which is itself concentrically surrounded by a relatively thin durable cover 14. Specifically, tubular member 11 is advantageously constructed of plastic pipe (preferably made using LaMode brand plastic resin manufactured by the General Electric Company). Inasmuch as this embodiment is primarily designed for a child's use, tubular member 11 has an outer diameter of approximately 1.25 inches (approximately 3 cm) and a length of approximately 10 inches (approximately 25 cm) to 12 inches (approximately 30 cm). These dimensions are not critical and are predicated by the size of the rider and the degree of comfort to be afforded by the seat to that rider. Relatively large children may require larger seats than those delineated above; while smaller children may prefer smaller seats than those delineated above.

Resilient layer 12 provides a cushion to absorb some of the road shock transmitted up through the frame of the bicycle and thereby prevents this shock from being transmittted through the seat to the rider. As such, layer 12 is a compressible material, such as a suitable polyurethane foam, rubber or the like. The thickness of this layer will depend upon the resiliency of the material and the amount of cushioning desired. Generally, this layer should be no thicker than approximately 0.5-0.75 inches (approximately 1.3-1.9 cm). Cover 14 concentrically surrounds layer 12. This cover is a durable thin material, such as nylon; although, the actual thickness of this material is not critical. In use, this cover is tightly wrapped around layer 12 and then secured in place by suitable mating fasteners 16 which are situated on the underside of bar 10. These fasteners are preferably velcro straps, as shown. Other suitably durable materials than nylon can be used for cover 14 and other types of fasteners (such as snaps and ties) than velcro can be employed for fasteners 16. Eyelets 18 are used to secure a saddle bag to the underside of bar 10. These eyelets are secured to tubular member 11.

As discussed in detail later, the ends of seat 3, i.e. ends 13 and 17, can take on various shapes and serve various purposes. For example, in the embodiment shown in FIG. 3, ends 13 and 17 are both translucent and each houses a lightbulb. In particular, end 17 comprises fluted end cap 171 which threadably engages with threads 178 located on an end of tubular member 11. This end cap is preferably constructed of a high-impact plastic or similar substance. Lightbulb 173 screws into socket 175. A battery (not shown but well known) is located within tubular member 11, and whenever a switch (also not shown but well known) situated on the underside of bar 10 is appropriately toggled, electrical power is applied from the battery to lightbulb 173 causing it to emit light. Clearly, a flasher circuit could also be located within tubular member 11 and, when energized, would cause the lightbulb to appropriately flash. In this manner, one or both sides of the bicycle seat will be lit which, in turn, will advantageously alert drivers to the presence of the bicycle at night. As such, this advantageoulsly increases the safety of night riding.

As previously discussed, the bicycle seat is secured, via seat post 15 and split compression joint 25, to frame 5. In particular, seat post 15 forms part of tubular member 11, as indicated in greater detail in the cross-sectional view shown in FIG. 7. To mount the seat to the frame, collar 27 is first slipped around the end of seat post 15 and the seat post and collar are then both inserted to the appropriate depth into seat post opening 30. Thereafter, lever 29 is rotated to compress arms 28 together against the collar thereby securing the seat post in place to the frame.

Figure 4:
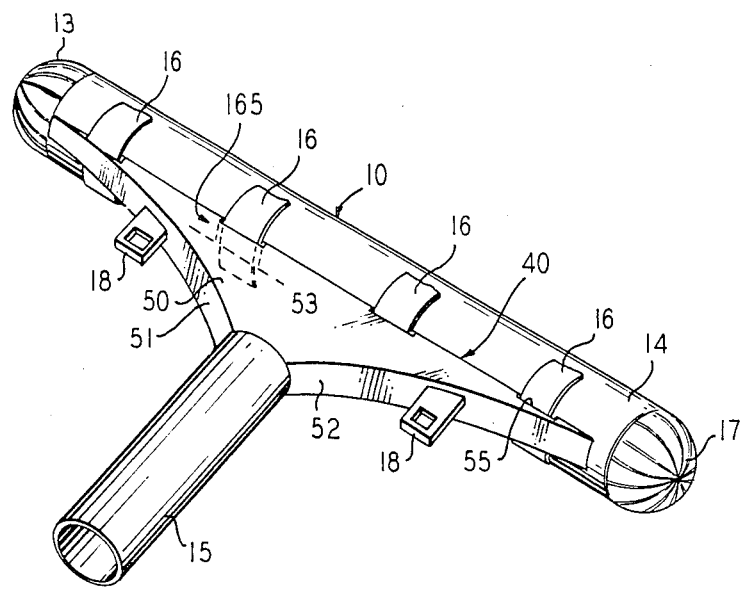
FIG. 4 shows a bottom perspective view of a second embodiment of a bicycle seat constructed in accordance with the principles of the present invention.

For adult riders, the seat shown in FIG. 3 is inadequate. This result occurs because to span the entire width of the buttocks, an adult will require a longer seat bar, generally 16 inches (approximately 41 cm) to 18 inches (approximately 46 cm) rather than the 10 to 12 inches used for a child's seat. As such, the ends of the bar will bend under an adult's weight unless the ends of the bar are supported. One embodiment useful for an adult's seat is shown in FIG. 4.

Here, as shown, bar 10 is supported along most of its bottom edge 40 by base 53 of triangularly shaped brace 50 which joins, at its downwardly pointing apex, seat post 15. By supporting the seat bar along most of its bottom edge, the brace advantageously strengthens the seat and allows it to readily support an adult without any bending occurring at its ends. Rigid tubular member 11 (not shown in FIG. 4), brace 50 and seat post 15 are integrally formed. Rigid member 11 preferably has an outer diameter of approximately 1.5 inches (approximately 4 cm). Eyelets 18 extend downward from sides 51 and 52 of brace 50. Rectangular cutouts 55, only one of which is specifically labelled, situated along side 53 of brace 50 provide suitable clearance for fasteners 16. Clasp 165, only one of which is shown to simplify the figure, forms part of each fastener. Clearly, cover 14 would contain suitable cutouts to allow the cover to snugly fit around the seat bar and abut against brace 50. In addition, the rigid tubular member, brace and seat post can be separate pieces which are suitably secured together, such as in the embodiment shown in FIG. 6.

Figure 5:
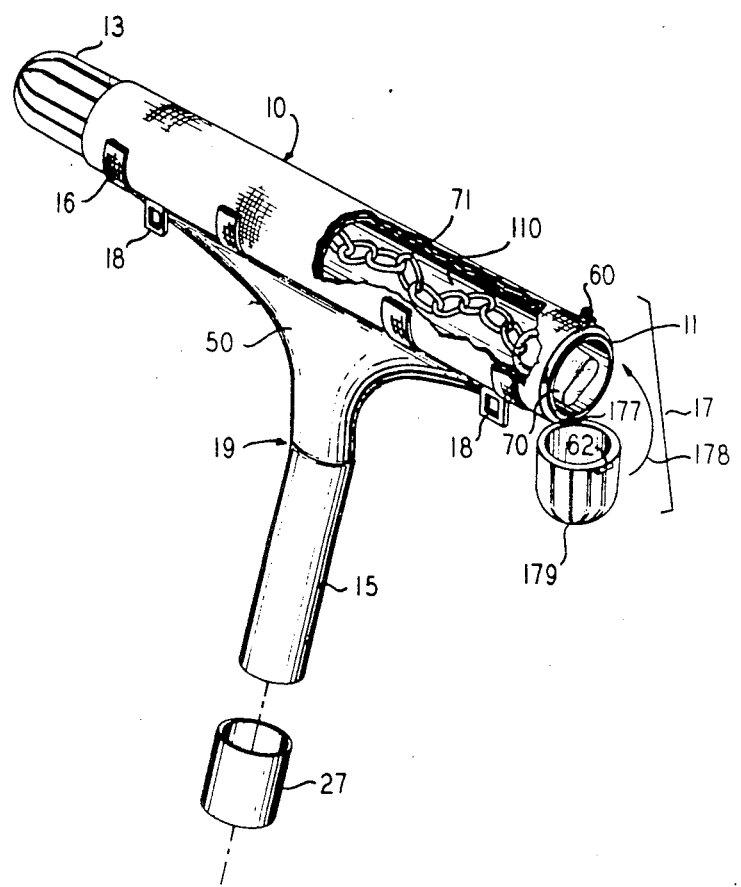
FIG. 5 shows a partial cutaway view of a third embodiment of a bicycle seat constructed in accordance with the principles of the present invention.

Another embodiment of the inventive bicycle seat is shown in FIG. 5. Here, the rider is afforded easy access to space 110 situated within rigid tubular member 11. This advantageously allows the rider to temporarily store relatively small objects, such as a bicycle lock comprised of padlock 70 and chain 71, within the bicycle seat. Specifically, to provide this access, end cap 179 is attached to rigid tubular member 11 by means of hinge 177 and is secured to the seat by a latch comprising hasp 60 and protruding edge 62. Once unlatched, the end cap can be readily pivoted towards and away from member 11. To "open" the seat, the rider moves hasp 60 to release edge 62 and thereby allow end cap 179 to pivot downward. Thereafter, the rider inserts an object into space 110 situated within the seat and then "closes" the seat by pivotting the end cap upward in the direction of arrow 178 and then latching hasp 60 over edge 62. In this embodiment, eyelets 18 are not formed as part of brace 50 but instead are integrally formed with tubular member 11 and extend downward in front of the brace, as shown. Moreover, seat post 15 contains bend 19 which serves to angle seat bar 10 slightly forward towards the rider. Bend 19 is relatively slight; nonetheless, by moving the seat slightly closer to the rider, this bend serves to increase the comfort provided by the seat to certain riders. Alternatively, if a rider prefers the seat angled slightly behind the natural angle of the seat post whenever it is slid within seat post opening 30 in frame 5, then the seat post can be rotated 180 degrees about its axis.

Figure 6:
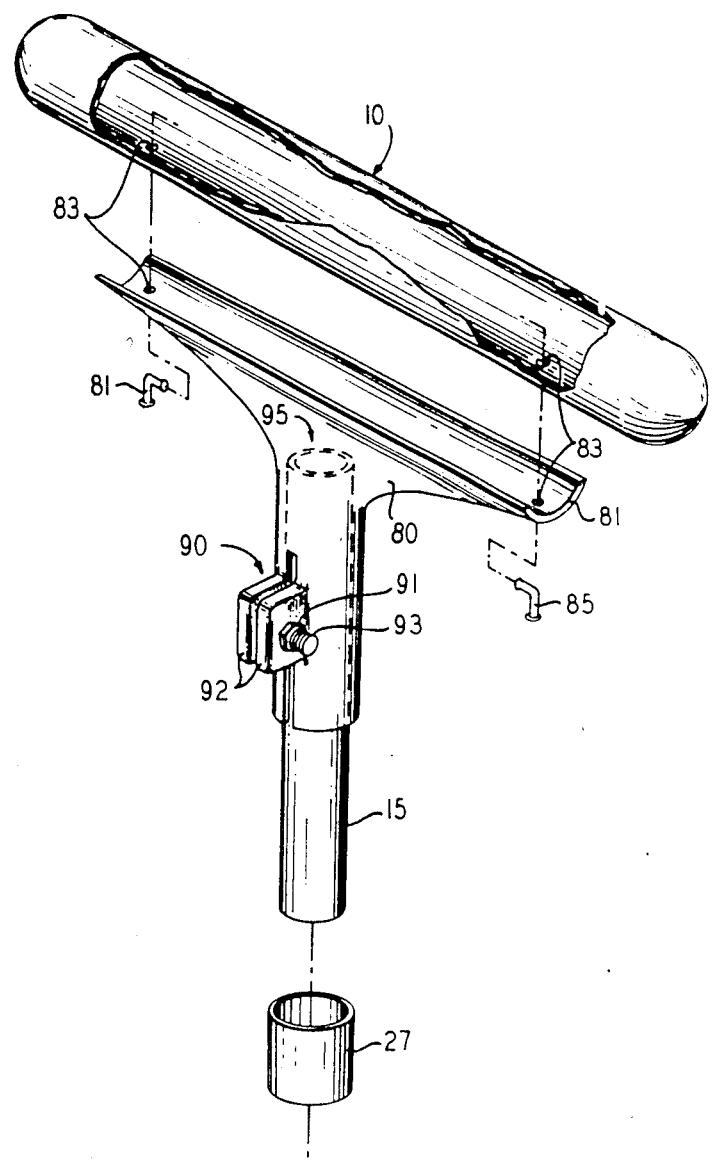
FIG. 6 shows an exploded and partial cutaway view of a fourth embodiment of a bicycle seat constructed in accordance with the principles of the present invention.
Figure 8:
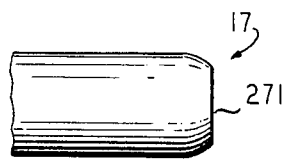
FIGS. 8-11 depict various embodiments of either end of the inventive bicycle seat shown in FIGS. 3, 4, 5 or 6.
Figure 9:
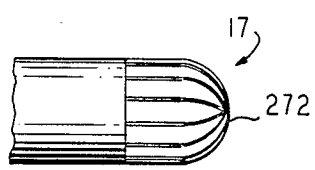

Another embodiment of the inventive bicycle seat is shown in FIG. 6. This embodiment permits seat bar 10 to be readily detached from seat post 15 and also permits the height of seat bar 10 to be adjusted separately along seat post 15 without disturbing the height of the seat post within bicycle frame 5. Specifically, the top leg of brace 80 contains curved top surface 81 which has substantially the same contour as the underside of seat bar 10. Once the seat bar is positioned onto surface 81 and holes 83 in both seat bar 10 and surface 81 are properly aligned, then locking pins 85 are inserted through aligned holes 83 to secure the seat onto the brace and prevent it from rotating thereon.

In addition, as shown in FIG. 6, triangularly shaped brace 80 contains split compression joint 90. This allows the height of the seat post and that of the bicycle seat to be independently adjusted. Specifically, with this embodiment, seat post 15 is first secured to bicycle frame 5, using compression joint 25 as shown in FIG. 3. Thereafter, seat bar 10 is secured to brace 80 as described above. Then, brace 80, and particularly compression joint 90, is slipped over upper end 95 of seat post 15. Once the brace is set to the proper height on the seat post, nut 91 is tightened on bolt 93 which moves arms 92 together thereby compressing the joint against the seat post and securely holding the seat at the desired height on the seat post.

Alternatively, in lieu of tightly holding the seat post in position, brace 80 could allow the seat post to move throughout a pre-defined vertical range. In this case, a shock absorber (well-known but not shown) would be positioned within the housing of brace 80 and above end 95 and would be connected between the brace housing and end 95 of seat post 15. To prevent the seat from rotating about the vertical axis of the seat post, the brace and seat post may both contain suitable mating vertical channels (splines) which allow relative vertical but not horizontal (rotational) movement. In this manner, road shock which would otherwise be sufficient to cause the seat to move vertically would be at least partially damped by the shock absorber and thereby advantageously prevented from reaching the rider.

Figure 7:
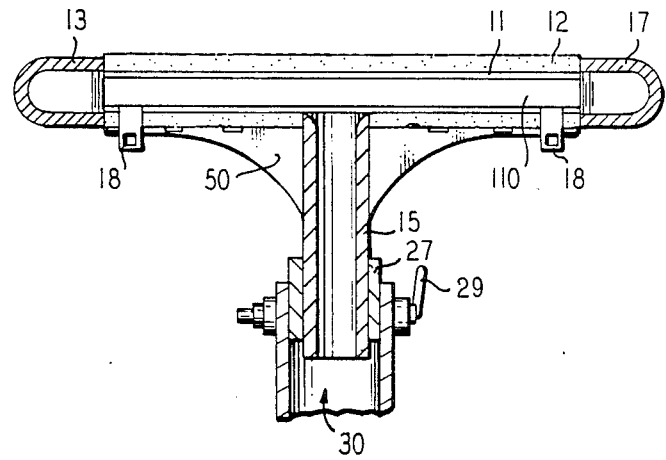
FIG. 7 shows a longitudinal cross sectional view of the bicycle seat shown in FIG. 5.

A simplified longitudinal cross-sectional view of the embodiment shown in FIG. 5 is provided in FIG. 7. To simplify the figure, hasp 60, protruding edge 62 and durable cover 14 are all omitted.

Figure 10:
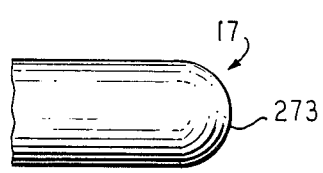
Figure 11:
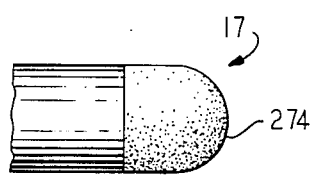

FIGS. 8-11 depict different arrangements for either end of seat bar 10. As shown, either end, illustratively end 17, may have a truncated end cap, such as end cap 271 shown in FIG. 8; a fluted translucent end cap, such as that described above in conjunction with FIGS. 3 and 5 and shown as end cap 272 in FIG. 9; a non-compliant solid rounded end such as end 273 which is integrally formed with tubular member 11 as shown in FIG. 10; or a complaint solid rubber end cap 274, as shown in FIG. 11. In addition, to increase night visibility, end 17 shown in FIGS. 8, 10 and 11 may be reflective or painted with a phosphorescent paint. Any of these end caps may be removeable to provide a temporary storage area within the seat bar, as discussed above.

At present, bicycles are being manufactured using seat posts having a variety of different diameters. Inasmuch as bicycle manufacturers have not standardized the diameter of seat posts to only one or two sizes, the proliferation of differently sized seat posts—now amounting to over fifty different sizes—has complicated the manufacture of bicycle seats by requiring that each seat be manufactured with the proper seat post for a particular bicycle. To reduce manufacturing costs and complexity, many replacement bicycle seats have only been made for popularly sized seat posts and, as a result, are simply not available for every bicycle. Hence, to widen the availability of replacement seats, increasing numbers of bicycle seats are now being made with mounting rails that are separated by a pre-set distance, typically two inches. Mounting brackets that accept these rails are fastened, using a split compression joint, onto the seat post for the particular bicycle. Once such a bracket is affixed to the seat post, this eliminates any size dependence between the bicycle seat and the seat post. As such, any bicycle seat with these standard sized rails can be attached to any bicycle having a mating bracket.

FIGS. 12-15 show two additional embodiments of inventive bicycle seats that incorporate mounting rails and are thus suitable for use with many currently available bicycles.

Figure 12:
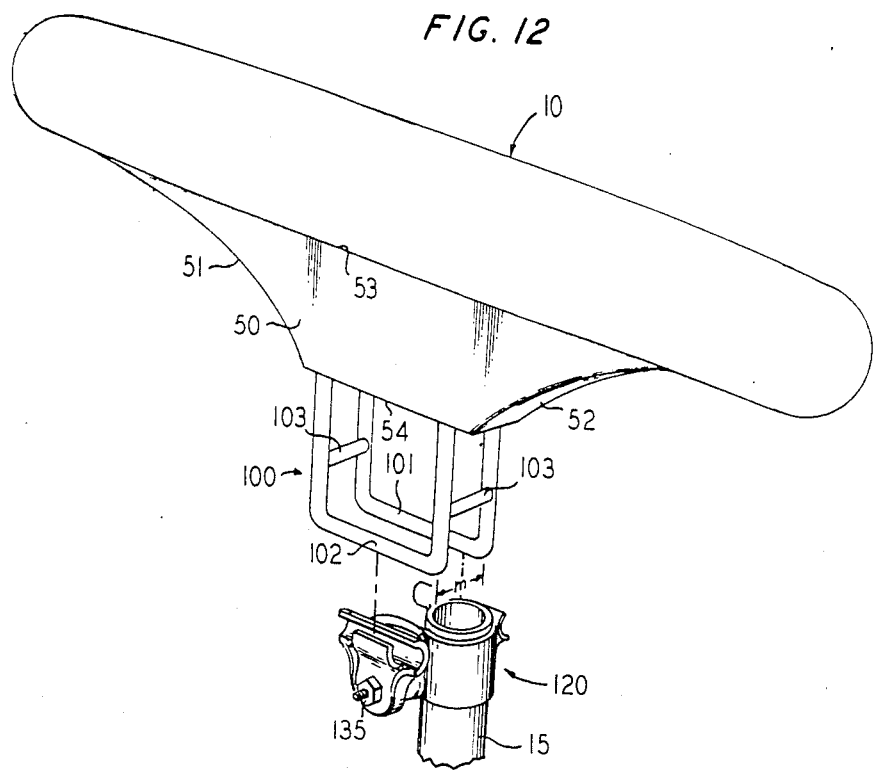
FIG. 12 is a top perspective view of a fifth embodiment of a bicycle seat constructed in accordance with the principles of the present invention.
Figure 13:
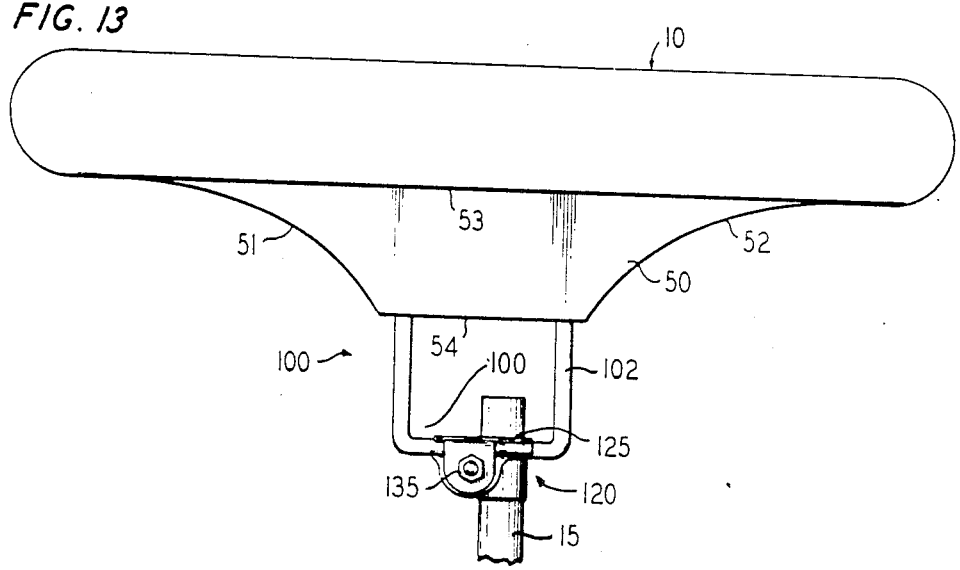
FIG. 13 is a front view of the bicycle seat shown in FIG. 12.

In particular, FIG. 12 is a top perspective view of a one embodiment of a bicycle seat that has mounting rails and is constructed in accordance with the principles of the present invention. Here, seat bar 10 has triangular brace 50 situated along the bottom edge of the seat bar. As previously described, top surface 53 of this brace extends across a substantial portion of the length of the seat bar and is centrally positioned along the bottom surface of the seat bar. This brace can be integrally formed with the seat bar or can be a separate piece that is securely fastened to the seat bar. In either case, two U-shaped legs 101 and 102 that together comprise rails 100 downwardly protrude from truncated apex 54 of brace 50. These rails are separated by a distance "m" that is approximately two inches wide. Each of two spacers 103 is affixed between adjacent parallel vertically oriented portions of legs 101 and 102 and serve to maintain a two inch spacing between the two legs that comprise the mounting rails. To mount this seat to the bicycle, rails 100 are placed between jaws 125 of bracket 120 and thereafter nut 125 is tightened to compress the jaws against the rails and thereby adequately secure the seat in place on the bicycle. A front view of the inventive bicycle seat shown in FIG. 12 is depicted in FIG. 13.

Figure 14:
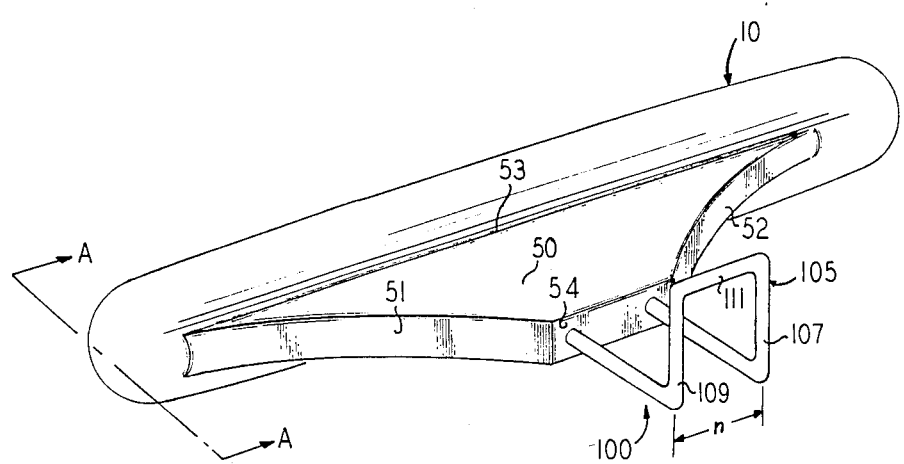
FIG. 14 is a bottom perspective view of a sixth embodiment of a bicycle seat constructed in accordance with the principles of the present invention.
Figure 15:
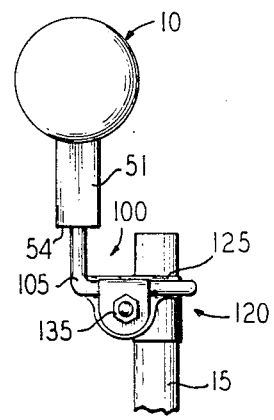
FIG. 15 is a left side view, taken along lines A—A, of the bicycle seat shown in FIG. 14.

FIG. 14 is a bottom perspective view of a second embodiment of a bicycle seat that uses mounting rails and is also constructed in accordance with the principles of the present invention. Here, rail 100 is formed of one leg 105 having two downwardly extending L-shaped sections 107 and 109 joined at their ends by spacer section 111, rather than using two separate U-shaped legs as shown in FIG. 12. Distance "n" between sections 107 and 109 is approximately two inches. Jaws 125 of bracket 120 grip portions 107 and 109 of leg 105. If both the seats shown in FIGS. 12 and 14 were mounted to respective bicycles with seat bar 10 oriented perpendicular to the plane of the wheels of the respective bicycle, bracket 120, used in conjunction with the embodiment shown in FIG. 14, will be rotated approximately ninety degrees from the position this bracket assumes when it is used with the bicycle seat in FIG. 12. A side view of the inventive bicycle seat shown in FIG. 14 and taken along lines A—A is shown in FIG. 15. Either of the embodiments shown in FIGS. 12 and 14 can utilize a lighted end cap as shown in FIG. 3 and discussed hereinabove, or can use any of the arrangements shown in FIGS. 8-11 and discussed hereinabove and/or can contain an internal storage space, as shown in FIG. 5, with access through a pivoting end cap, also as discussed hereinabove.

Furthermore, although rigid member 11 has been shown and discussed as being cylindrical and specifically tubular, this member can instead be a solid cylindrical member if no need exists to have a storage space located within the seat bar.

By now, those skilled in the art readily recognize that a seat constructed in accordance with the teachings of the present invention is not limited to a bicycle seat. For example, such a seat can be mounted in a wide variety of vehicles or even mounted, e.g. using a seat post anchored to the ground or floor, for stationary use. A seat of this type is not only comfortable but also occupies very little room. Hence, such a seat should find use in many applications in which available seating space is limited.

Although various embodiments have been shown and described herein, these merely illustrate the teachings of the present invention. Clearly, the features embodied in the seat shown in any of the figures, such as the lighted end cap, the storage space or the detachable seat bar, can be readily incorporated in the seat shown in any of the other figures to yield a variety of different arrangements than those shown and described herein. Hence, those skilled in the art may construct other varied embodiments without departing from the teachings of the present invention.

I claim:

1. A bicycle seat for accommodating a rider comprising:
    a cylindrical seat bar having
        a rigid tubular member extending substantially the entire width of the seat;
        a resilient material of pre-determined thickness concentrically surrounding said tubular member; and
        a relatively thin cover of durable material concentrically surrounding said resilient material; and
    a tubular seat post of pre-determined length substantially perpendicularly oriented to said seat bar and downwardly extending from the center of said bar;
    wherein the seat bar is mounted to the bicycle in a direction substantially tranverse to the frame of the bicycle so that the seat bar abuts against and spans the entire width of the rider's buttocks and does not contact the crotch of the rider whenever the rider sits on the bicycle.

2. The seat in claim 1 wherein the thin cover further comprises a durable material having a plurality of mating fasteners so that said cover can first be concentrically placed around said resilient material with the fasteners located along the bottom surface of the seat bar and then secured in place by mating said fastener portions together.

3. The seat in claim 2 wherein said fasteners are velcro straps.

4. The seat in claim 3 further comprising a cap situated at each end of the seat, wherein one of said caps matingly engages with an associated end of the tubular member so that said one cap is capable of being disengaged from said member in order to provide access to the space enclosed by said tubular member whereby objects can be placed therein.

5. The seat in claim 4 further comprising a hasp and a protruding edge portion, wherein the hasp is mounted to said seat bar and extends in the direction of said one cap, and the edge portion is situated on said one cap so that whenever said one cap is abuttingly engaged with said associated end of the tubular member said hasp and said edge portion can come into abutting engagement with each other thereby lockably securing said one cap to the associated end of the tubular member.

6. The seat in claim 4 further comprising:
    a battery powered light circuit situated within the space enclosed by said tubular member and located in the vicinity of one of the ends of said tubular member;
    said cap associated with said end is substantially translucent; and
    a light bulb which forms part of said circuit and which is encased by said translucent end cap whenever said end cap matingly engages with said associated end.

7. The seat in claim 4 wherein at least one of said caps is reflective or phosphorescent.

8. The seat in claim 4 wherein at least one of said caps is substantially solid and truncated, or substantially rounded.

9. The seat in claim 2 further comprising a triangularly shaped brace having a base and situated between the lower surface of the seat bar and the seat post wherein the base extends across substantially the entire length of the underside of the seat bar.

10. The seat in claim 9 wherein the seat post is further comprised of a slight bend situated close to the seat bar which angles the seat bar towards the rider.

11. The seat in claim 9 further comprising:
    a cupped surface being situated along one leg of the brace and having a contour to match the curvature of a lower surface of the seat bar;
    a first hole situated in said cupped surface;
    a second hole situated in the lower surface of said seat bar; and
    a locking pin inserted through said first and second holes so that whenever said seat bar is placed onto said brace, and said first and second holes are aligned with each other and said pin extends therethrough, said pin prevents said seat bar from separately moving on said brace.

12. The seat in claim 11 wherein the seat post is further comprised of a slight bend situated close to the seat bar which angles the seat bar towards the rider.

13. The seat in claim 2 further comprising a triangularly shaped brace having a base, a downwardly pointing apex and a compressible joint situated at the apex, and situated between the lower surface of the seat bar and the seat post, wherein the base extends across substantially the entire length of the underside of the seat bar and wherein the seat post slidably engages into the compressible joint and is locked in place by rotating a fastener located on said joint which, when rotated, draws two arms of said joint together and thereby compressing said joint around said seat post.

14. The seat in claim 13 wherein the seat post is further comprised of a slight bend situated close to the seat bar which angles the seat bar towards the rider.

15. The seat in claim 1 wherein the seat post is further comprised of a slight bend situated close to the seat bar which angles the seat bar towards the rider.

16. A bicycle seat for accommodating a rider comprising:
    a cylindrical seat bar having
        a rigid cylindrical member extending substantially the entire width of the seat;
        a resilient material of pre-determined thickness concentrically surrounding said tubular member; and
        a cover of durable material concentrically surrounding said resilient material;
    wherein the cylindrical seat bar is mounted to the bicycle in a direction substantially tranverse to the frame of the bicycle so that the seat bar abuts against and spans the entire width of the rider's buttocks and does not contact the crotch of the rider whenever the rider sits on the bicycle.

17. The seat in claim 16 further comprising a triangularly shaped brace having an apex and a base, said base being affixed to a bottom surface of the seat bar such that the base extends across a substantial portion of the entire length of the bottom surface of the seat bar and is centrally positioned thereon.

18. The seat is claim 17 further comprising means running perpendicularly downward from the apex of said brace for rigidly securing the seat to a frame of the bicycle.

19. The seat in claim 18 wherein said securing means comprises at least two U-shaped members oriented parallel to each other for matingly engaging with a suitable bracket attached to the frame of said bicycle, wherein each U-shaped member has two vertically oriented legs extending perpendicularly downward from said apex and each U-shaped member is separated by a pre-determined distance from the other one of said U-shaped members.

20. The seat in claim 19 further comprising a cap situated at each end of the seat, wherein one of said caps matingly engages with an associated end of the cylindrical member so that said one cap is capable of being disengaged from said cylindrical member in order to provide access to space enclosed by said cylindrical member whereby objects can be placed therein.

21. The seat in claim 20 further comprising a hasp and a protruding edge portion, wherein the hasp is mounted to said seat bar and extends in the direction of said one cap, and the edge portion is situated on said one cap so that whenever said one cap is abuttingly engaged with said associated end of the cylindrical member said hasp and said edge portion can come into abutting engagement with each other thereby lockably securing said one cap to the associated end of the cylindrical member.

22. The seat in claim 21 further comprising:
a battery powered light circuit situated within the space enclosed by said cylindrical member and located in the vicinity of one of the ends of said cylindrical member;
said cap associated with said end is substantially translucent; and
a light bulb which forms part of said circuit and which is encased by said cylindrical end cap whenever said end cap matingly engages with said associated end.

23. The seat in claim 22 wherein at least one of said caps is reflective or phosphorescent.

24. The seat in claim 23 wherein at least one of said caps is substantially solid and truncated, or substantially rounded.

25. The seat in claim 18 wherein said securing means comprises two downwardly extending L-shaped members oriented parallel to each other and separated by a spacing member having a pre-determined length and connected to corresponding ends of said L-shaped members, wherein said spacing member matingly engages with said bracket to secure said seat to said bicycle.

26. The seat in claim 25 further comprising a cap situated at each end of the seat, wherein one of said caps matingly engages with an associated end of the cylindrical member so that said one cap is capable of being disengaged from said cylindrical member in order to provide access to space enclosed by said cylindrical member whereby objects can be placed therein.

27. The seat in claim 26 further comprising a hasp and a protruding edge portion, wherein the hasp is mounted to said seat bar and extends in the direction of said one cap, and the edge portion is situated on said one cap so that whenever said one cap is abuttingly engaged with said associated end of the cylindrical member said hasp and said edge portion can come into abutting engagement with each other thereby lockably securing said one cap to the associated end of the cylindrical member.

28. The seat in claim 27 further comprising:
a battery powered light circuit situated within the space enclosed by said cylindrical member and located in the vicinity of one of the ends of said cylindrical member;
said cap associated with said end is substantially translucent; and
a light bulb which forms part of said circuit and which is encased by said cylindrical end cap whenever said end cap matingly engages with said associated end.

29. The seat in claim 28 wherein at least one of said caps is reflective or phosphorescent.

30. The seat in claim 29 wherein at least one of said caps is substantially solid and truncated, or substantially rounded.

* * * * *